March 7, 1944.　　　W. W. ROBINSON　　　2,343,846
FLUOROSCOPE
Filed June 19, 1942　　2 Sheets-Sheet 1
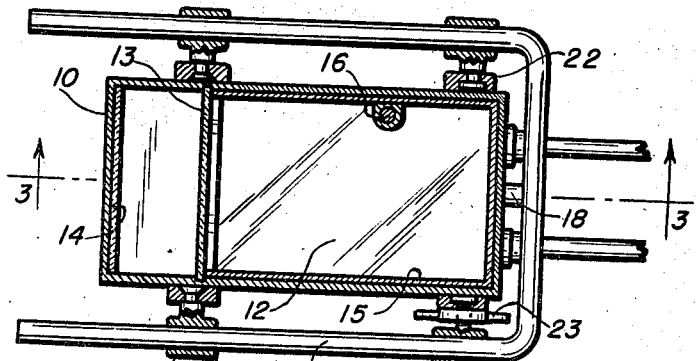
FIG_2
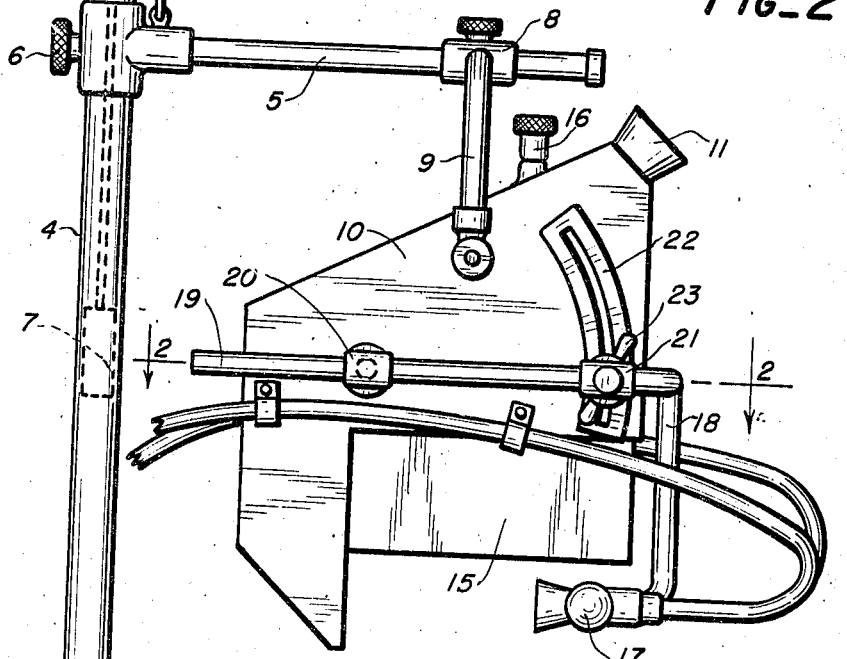
FIG_1
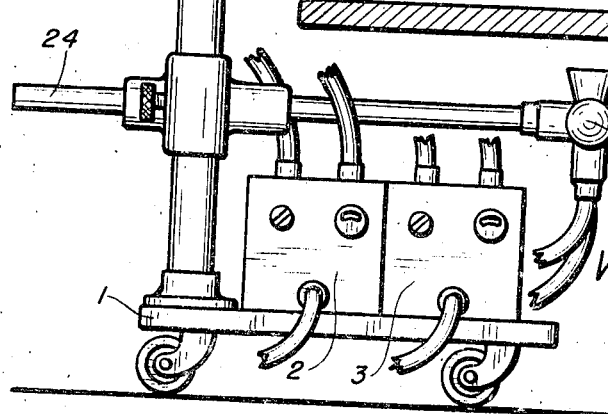
WILLIAM W. ROBINSON
INVENTOR
BY Herbert E. Smith
ATTORNEY

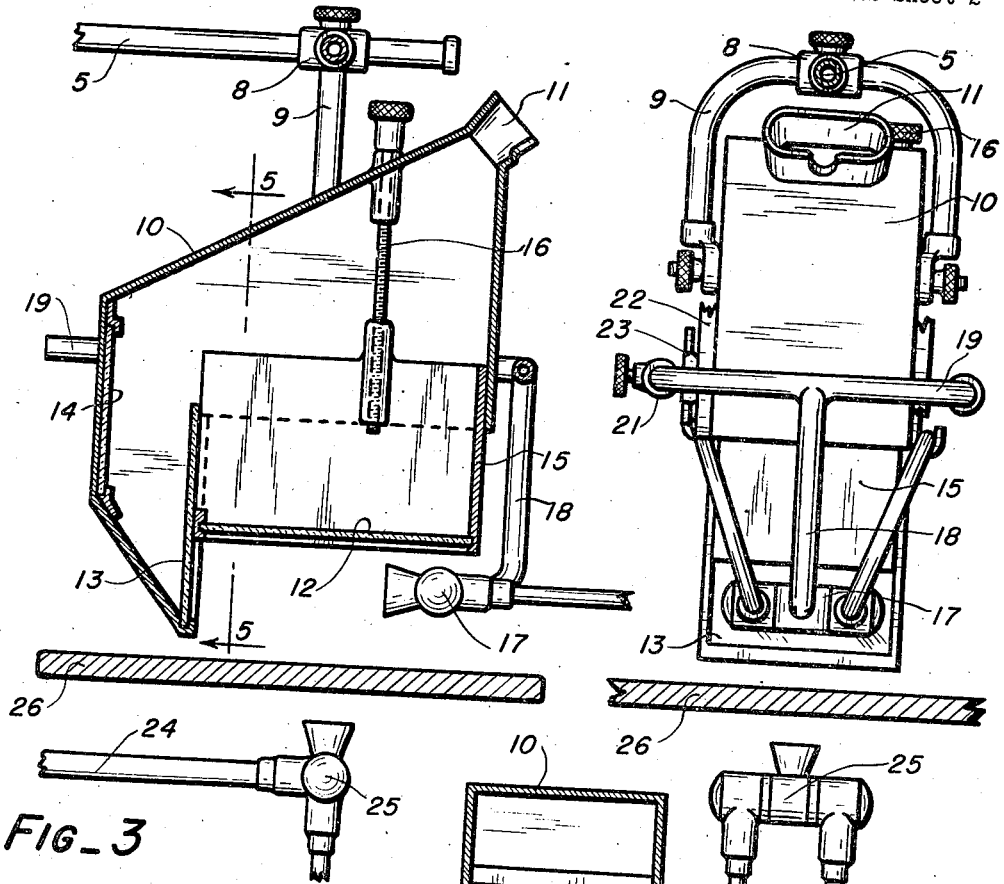

Patented Mar. 7, 1944

2,343,846

UNITED STATES PATENT OFFICE 2,343,846

FLUOROSCOPE

William W. Robinson, Spokane, Wash.

Application June 19, 1942, Serial No. 447,698

3 Claims. (Cl. 250—58)

The present invention relates to fluoroscopes and in more particular to a fluoroscopic viewing device.

In the prior art, in order to get a two-dimensional view of an object, it was necessary to either shift the X-ray tube and fluoroscope screen about from one position to another, or else shift the object to be viewed. This has required a great deal of time and effort, particularly if the object such as a fractured limb of a person were to be moved.

In many instances it is even more difficult to move the apparatus as such is heavy and bulky. Furthermore, much time is consumed in actual X-raying. This may oftentimes result in over-exposing of the patient to the X-rays, resulting in damage to the tissue structure. Prolonged exposure oftentimes has a detrimental effect upon the operators of the apparatus.

Having in mind these defects of the prior art, it is an object of the present invention to arrange fluoroscope tubes and a viewing box so that an object may be viewed from more than one direction without the viewer moving from a single viewing position, and without movement of the object being viewed.

It is a further object of the present invention to construct a viewing box with a plurality of fluorescent screens and a mirror or mirrors so arranged that all screens may be viewed from a single position, giving intersecting views of the object simultaneously.

A further object of the present invention is the arrangement of a viewing box with two screens at right angles and a mirror so arranged that both of the screens may be seen from a single viewing position.

A further object of the present invention is the provision in a viewing box of: two fluorescent screens arranged at an angle to each other, one of said screens being adjustable to a series of parallel positions, the relation to each of said screens of an X-ray tube, means for varying the relative distance between each of said tubes and its respective screen, and the provision in said box of a mirror whereby both of said screens may be viewed from a single viewing position.

Having in mind the defects of the prior art and these objects, applicant has constructed a fluoroscope having a viewing box and associated with said box a plurality of X-ray tubes and a fluorescent screen for each of said tubes. The fluorescent screens are mounted in the box at right angles to each other. The upper front side of the box has a viewing opening with a shield around it to exclude light so that when a person's face is placed in the opening both eyes may be used and the outside light excluded. Inside and at the back of the box is placed a mirror which gives a view of an upright fluorescent screen. The horizontal screen may be viewed directly from the viewing opening. The horizontal screen is mounted for vertical parallel movement so that it may be adjusted upwardly and downwardly to lie as close as possible to the object being viewed. Supported by the box is an X-ray tube adapted to fluoresce the vertical screen. This X-ray tube may be moved back and forth away from the screen and also swung up out of the way when an object is being placed upon the viewing table. The second X-ray tube which fluoresces the horizontal screen is located below the table. The viewing box as a whole may be adjusted upwardly and downwardly and in and out, to place both screens as close as possible to the object. The whole box is mounted upon a standard or supporting post which allows the apparatus as a whole to be moved out of the way. The usual accessory equipment, such as transformers and controls, are carried on the base of the standard and are associated with the fluorescent tubes.

A device such as described above is shown in detail in the accompanying drawings, wherein:

Figure 1 is an assembly view of the complete device,

Figure 2 is a horizontal sectional view of the viewing box taken on the line 2—2 of Figure 1, Figure 3 is a vertical cross-sectional view of the box on the line 3—3 of Figure 2, Figure 4 is an end view of the viewing box, Figure 5 is an end view section on the line 5—5 of Figure 3, and Figure 6 is a schematic showing of the operation of the viewing box and X-ray tubes when associated with an object.

The complete fluoroscope assembly is mounted upon a mobile base 1, which carries thereon two transformers, 2, 3, one for each X-ray tube, and each of the transformers having associated therewith the usual control apparatus. The base also carries a standard or support post 4, which carries the rest of the fluoroscopic apparatus.

On the upper portion of the standard is a horizontal viewing box arm 5, which is adjustably secured to the standard by means of a sleeve and a set screw 6. The weight of the arm and the equipment carried thereby is counterbalanced in the usual manner, by means of the counterbalance weight 7 which is connected to the viewing box arm by means of a cord strung over a pulley mounted upon the top of the arm.

Sliding on the viewing box arm is an adjustable clamp 8 to which is secured the yoke 9. Between the depending arms of the yoke 9 is the viewing box 10. The viewing box is adjustably pivoted to the lower end of the depending yoke so that the angle of the box with respect to the yoke may be varied. The viewing box 10 has a view opening 11 which is shaped to fit around the eyes of a person and, with the addition of some soft yielding material around the edges of the opening, to exclude any light from entering the opening when a person's face is therein. The viewing opening is so placed and directed that a view is had of the interior of the box.

Placed horizontally in the bottom of the box is one of two fluorescent screens. Arranged at right angles to the horizontal fluorescent screen 12 is a vertical fluorescent screen 13. A view of the vertical fluorescent screen may be had from the opening 11 by means of the mirror 14 placed upon the back wall of the box.

The vertical fluorescent screen 13 is secured rigidly to the box, while the horizontal fluorescent screen 12 is supported in a separate housing structure 15 which is adjustable up and down so that the horizontal screen may assume a plurality of parallel positions. An adjusting screw 16 is provided for the structure 15 to raise and lower it, the structure being provided with a cooperative screw thread. Naturally other means to accomplish this movement may be used. The screw 16 secured to the viewing box so that, upon rotation, it will raise and lower the structure 15 and the horizontal fluorescent screen.

Supported by the viewing box is an X-ray tube 17 adapted to radiate horizontally upon the vertically positioned fluorescent screen. This horizontally directed tube is supported upon a double yoke, one arm 18 of the yoke being attached to the tube and extending horizontally and then vertically and then being split, passing around the box in the form of a second yoke 19. This second yoke is slidably supported so that the tube itself may be moved to and from the vertical screen. The split yoke arm 19 is journalled on each side of the viewing box in suitable guides. The rearward guide 20 is pivoted so that the tube when in a forward position may be raised upwardly out of the way. The front support 21 is carried on a sector 22 to which it may be adjustably clamped by means of the clamp 23.

Supported upon the lower part of the standard 4 is a lateral arm 24 for carrying the vertically directed X-ray tube 25, which may be adjusted upwardly or downwardly upon the standard to bring it into the desired relationship with the horizontally arranged fluorescent screen 12, and with the supporting surface of the X-ray cart or table 26.

The horizontal X-ray tube 17 and the vertically directed X-ray tube 25 are both connected by means of suitable electrical conductors with the transformers which in turn are connected to a source of power.

Figure 6 is a schematic arrangement of the above-described device, showing the two tubes 17 and 26 focused upon an object O with the viewing box and fluorescent screens adjusted in close relationship to the object. It also shows the lines of sight from an operator's eye, placed in the viewing box opening 11, to either of the fluorescent screens. The path from the vertical fluorescent screen being to the mirror 14 and then to the eye, while that from the horizontal fluorescent screen 12 is directly to the eye.

In using the present device, the patient or other object to be viewed is placed upon a suitable cart or X-ray table 26, and the fluorescent apparatus then wheeled into position with the vertical screen being placed close to the side of the object and the horizontal screen being adjusted vertically by means of the adjusting screw 16 so that it, too, is close to the object. The horizontally directed X-ray tube is then dropped down into position and slid along until it, also, is close to the object. The vertically directed tube is then adjusted on the standard until it is near the bottom of the supporting table. The operator then takes his station at the viewing opening of the viewing box 10, where, upon operation of the X-ray tubes, either separately or simultaneously, and by glancing from one screen to the other, with the aid of the mirror 14, he may see the object in two dimensions. By being able to see the object in two dimensions, any adjustments that need to be made may be made quickly without the necessity of the operator or the patient being exposed for long periods of time to the harmful X-rays, such as would be necessary with the use of a single tube or even with two tubes if the operator were to have to shift his position from one side to another to obtain proper views of the object.

Having thus described my invention, I claim:

1. A fluoroscope, comprising: a closed housing having a viewing opening, an upright mirror so positioned that said mirror is within the range of vision of a person looking through said opening, an upright fluorescent screen in said housing so positioned that it may be scanned from said viewing opening by means of an upright mirror, a horizontal fluorescent screen within said housing angularly disposed with relation to said upright screen and having a position whereby it may be directly scanned through said viewing opening, said horizontal screen being movable in said housing to a series of parallel positions, means operable externally of said housing for moving said horizontal screen, a source for projecting a beam of X-rays toward said horizontal screen, an extensible arm carried by said housing, a second source for projecting a beam of X-rays toward the upright screen carried by and movable relative the screen by the extension or retraction of said arm, and means for supporting an object to be examined for viewing in two planes at the intersection of the medians of the two beams of X-rays.

2. A fluoroscope, comprising: a closed housing having a viewing opening, an upright mirror so positioned that said mirror is within the range of vision of a person looking through said opening, an upright fluorescent screen in said housing so positioned that it may be scanned from said viewing opening by means of the upright mirror, a horizontal fluorescent screen within said housing angularly disposed with relation to said upright screen and having a position whereby it may be directly scanned through said viewing opening, said horizontal screen being movable in said housing to a series of parallel positions, means operable externally of said housing for moving said horizontal screen, a source for projecting a beam of X-rays toward said horizontal screen, an extensible arm pivoted to said housing to be swung to an upper inoperative position, a second source for projecting a beam of X-rays toward the upright screen carried by and movable relative the screen by the downward swinging and extension or retraction of said arm, and means for supporting an object to be examined for viewing in two planes at the intersection of the medians of the two beams of X-rays.

3. A fluoroscope, comprising: a closed housing forming a dark chamber and having a viewing opening, an upright mirror so positioned that said mirror is within the range of vision of a person looking through said opening, an upright fluorescent screen in said housing so positioned that it may be scanned from said viewing opening by means of the upright mirror, a boxing movable in said housing, a horizontal fluorescent screen carried by said boxing angularly disposed with relation to said upright screen and having a position whereby it may be directly scanned through said viewing opening, said horizontal screen being movable with said boxing to a series of parallel positions, means operable externally of said housing for moving said boxing, a source for projecting a beam of X-rays toward said horizontal screen, an extensible arm carried by said housing, a second source for projecting a beam of X-rays toward the upright screen carried by and movable relative the screen by the extension and retraction of said arm, and means for supporting an object to be examined for viewing in two planes at the intersection of the medians of the two beams of X-rays.

WILLIAM W. ROBINSON.